United States Patent
Yoon

(10) Patent No.: US 7,812,892 B2
(45) Date of Patent: Oct. 12, 2010

(54) CAR AUDIO/VIDEO SYSTEM HAVING A TILT BUTTON FOR CONTROLLING TILT MOTION OF A FRONT PANEL

(75) Inventor: Seong-Ho Yoon, Seoul (KR)

(73) Assignee: Namsung Corporation, Seoul (KR)

( * ) Notice: Subject to any disclaimer, the term of this patent is extended or adjusted under 35 U.S.C. 154(b) by 1443 days.

(21) Appl. No.: 11/142,142

(22) Filed: Jun. 1, 2005

(65) Prior Publication Data

US 2006/0112409 A1 May 25, 2006

(30) Foreign Application Priority Data

Nov. 25, 2004 (KR) .................. 10-2004-0097534

(51) Int. Cl.
 *H04N 7/00* (2006.01)
(52) U.S. Cl. ........................ 348/837; 345/1.1
(58) Field of Classification Search ............ 386/46, 386/117, 118; 348/837, 840; 345/1.1; 349/11
 See application file for complete search history.

(56) References Cited

U.S. PATENT DOCUMENTS

| | | | | |
|---|---|---|---|---|
| 5,539,429 | A * | 7/1996 | Yano et al. ............. | 345/173 |
| 6,067,078 | A * | 5/2000 | Hartman ............. | 345/168 |
| 6,373,213 | B1 * | 4/2002 | Watanabe et al. ............. | 318/445 |
| 6,570,628 | B1 * | 5/2003 | Hirano ............. | 349/11 |
| 7,002,548 | B2 * | 2/2006 | Yamaguchi et al. ............. | 345/110 |
| 7,714,800 | B2 * | 5/2010 | Kobayashi ............. | 345/1.1 |
| 2002/0084910 | A1 * | 7/2002 | Owens et al. ............. | 340/825.24 |

FOREIGN PATENT DOCUMENTS

| | | | |
|---|---|---|---|
| JP | 5-270324 | * | 10/1993 |
| JP | 9-138652 | * | 5/1997 |
| JP | 11-282376 | * | 10/1999 |

* cited by examiner

*Primary Examiner*—David E Harvey
(74) *Attorney, Agent, or Firm*—Hamre, Schumann, Mueller & Larson, P.C.

(57) ABSTRACT

Disclosed herein is a car audio/video (A/V) system in which both a rear panel informing a user of a variety of operational statuses of the car A/V system and a front panel having a TFT-LCD panel are installed in a 1-DIN-sized casing, thus improving the efficiency of usage of a limited space. The car A/V system includes a rear panel provided with a first display unit; a front panel provided with a plurality of key input elements and a second display unit; and a control means for executing an operation corresponding to a specified command signal input by manipulating the key input elements. In the car A/V system, both the front panel and the rear panel are installed in the front of a 1-DIN (Deutsches Institut füur Normung)-sized casing of the system such that the front panel is placed in front of the rear panel and both the front panel and the rear panel are tilted as directed by the control means and are opened forward from the front of the casing.

10 Claims, 11 Drawing Sheets

(a)  (b)

(a)　　　　　　　　　　　　　(b)

(a)  (b)

(a)  (b)

CAR AUDIO/VIDEO SYSTEM HAVING A TILT BUTTON FOR CONTROLLING TILT MOTION OF A FRONT PANEL

BACKGROUND OF THE INVENTION

1. Field of the Invention

The present invention relates generally to car audio/video systems and, more particularly, to a car audio/video system in which both a front panel and a rear panel are installed in the front of a 1-DIN-sized casing.

2. Description of the Related Art

Generally, car audio systems comprise tuners, cassette decks, CD (compact disc) players, etc., and are used for listening to music or the radio.

Such a car audio system is typically installed in a dashboard that is placed in front of a driver's seat, so that a driver can easily operate the car audio system while driving a car.

The car audio systems have been typically fabricated to have a 1-DIN (Deutsches Institut für Normung, German standard) size which has dimensions of about 178 mm width, 165 mm depth, and 50 mm height, and each includes an integrated front panel that is provided thereon with a plurality of control knobs, control buttons and a display unit having a predetermined size. The display unit of the car audio systems comprises a display panel, such as an LCD (liquid crystal display) panel, and displays thereon visual information, such as power status, volume level and radio mode/CD mode.

The above-mentioned display unit of the car audio systems has typically been installed in the central portion of the front panel. However, as the display unit is small-sized, the letters or figures displayed on the display unit are not clear, so that a driver must dangerously and repeatedly view the display unit in order to confirm the unclear letters or figures on the display unit. Thus, the driver, while driving a car, neglects to watch the road ahead, so that the driver cannot drive safely.

In recent years, a television function, allowing passengers in a car to view a television receiver that receives television broadcasts via terrestrial waves or communication satellites, and a navigation function have been combined with the car audio systems. Thus, the conventional car audio systems have been replaced with car audio/video (A/V) systems in which a video function is combined with the conventional audio function.

When drivers and passengers watch television or read maps using the conventional car A/V systems, a separate monitor for watching, which has a predetermined size, must be provided in addition to the front panel. Thus, to equip a car with the television function and the navigation function, the owner of the car must additionally purchase a monitor, which is expensive, and must undergo an inconvenience of forming a plurality of holes through the dashboard of his/her car, attaching a monitor support bracket to the dashboard using the holes, and mounting the monitor to the support bracket.

In an effort to allow the owners of cars to avoid the above-mentioned inconvenient work, a car A/V system which is 2-DIN-sized and is equipped with two front panels has been proposed. In the 2-DIN-sized car A/V system, one front panel is provided with a plurality of control knobs, control buttons and a display unit, while the other front panel is used as a monitor panel.

However, when the car A/V system is 2-DIN-sized, it is necessary to change the size of a cartridge of the dashboard, which has been typically manufactured to be compatible with 1-DIN-sized car A/V systems, to accommodate the 2-DIN-sized system. Due to the change in the size of the cartridge, the space occupied by the car A/V system in the dashboard is enlarged, so that the 2-DIN-sized car A/V system negatively affects the arrangement of other elements in the dashboard.

Furthermore, a car A/V system having a front panel drive mechanism, in which two front panels are normally retracted in a frame and project outwards such that one front panel moves upward and the other front panel moves downward, has been proposed. However, the car A/V system having the front panel drive mechanism is problematic in that the upward moving front panel hides the gauges, control knobs and control buttons on the dashboard, so that a driver must retract the upward moving front panel into the frame to expose the gauges, control knobs and control buttons to the outside when wanting to use them, and the retraction of the front panel into the frame inconveniences the driver.

SUMMARY OF THE INVENTION

Accordingly, the present invention has been made keeping in mind the above problems occurring in the related art, and an object of the present invention is to provide a car audio/video system in which both a rear panel informing a user of a variety of operational statuses of the car A/V system and a front panel having a TFT-LCD panel are installed in a 1-DIN-sized casing, thus improving the efficiency of usage of a limited space.

In order to accomplish the above object, in one aspect, the present invention provides a car audio/video system, comprising: a rear panel provided with a first display unit; a front panel provided with a plurality of key input elements and a second display unit; and a control means for executing the operation corresponding to a specified command signal input by manipulating the key input elements, wherein both the front panel and the rear panel are installed in front of a 1-DIN-sized casing of the system such that the front panel is placed in front of the rear panel and both the front panel and the rear panel are tilted as directed by the control means and are opened forward from the front of the casing.

In another aspect, the present invention provides a car audio/video system, comprising: a rear panel provided with a first display unit; a front panel provided with a plurality of key input elements and a second display unit, the key input elements being used to select a desired mode from among a radio mode, an optical disc mode and a TV mode, and to input fine adjustment values, a mode change signal and an operation command signal in a selected mode; and a main unit comprising: a radio broadcast signal processing means for processing a signal of a radio broadcast channel selected by an AM/FM tuner; a TV broadcast signal processing means for processing a signal of a TV broadcast channel selected by a TV tuner; an optical disc playing means for playing an optical disc having sound data recorded thereon and reproducing sound; and a control means for executing the operation corresponding to a specified command signal input by manipulating the key input elements, wherein both the front panel and the rear panel are installed in the front of a 1-DIN-sized casing of the system such that the front panel is placed in front of the rear panel and both the front panel and the rear panel are moved as directed by the control means.

In a further aspect, the present invention provides a car audio/video system, comprising: a rear panel provided with a first display unit; a front panel provided with a plurality of key input elements and a second display unit, the key input elements being used to select a desired mode from among a radio mode, an optical disc mode, a TV mode and an external input mode, and to input fine adjustment values, a mode change signal and an operation command signal in a selected mode; a main unit comprising: a radio broadcast signal processing means for processing a signal of a radio broadcast channel selected by an AM/FM tuner; a TV broadcast signal processing means for processing a signal of a TV broadcast channel selected by a TV tuner; an optical disc playing means for playing an optical disc having sound data recorded thereon and reproducing sound; and a control means for executing the operation corresponding to a specified command signal input by manipulating the key input elements; and an external audio/video selecting means for controlling, in conjunction with the control means, the input/output of external input signals transmitted from an external input source, wherein both the front panel and the rear panel are installed in the front of a 1-DIN-sized casing of the system such that the front panel is placed in front of the rear panel and both the front panel and the rear panel are moved as directed by the control means.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
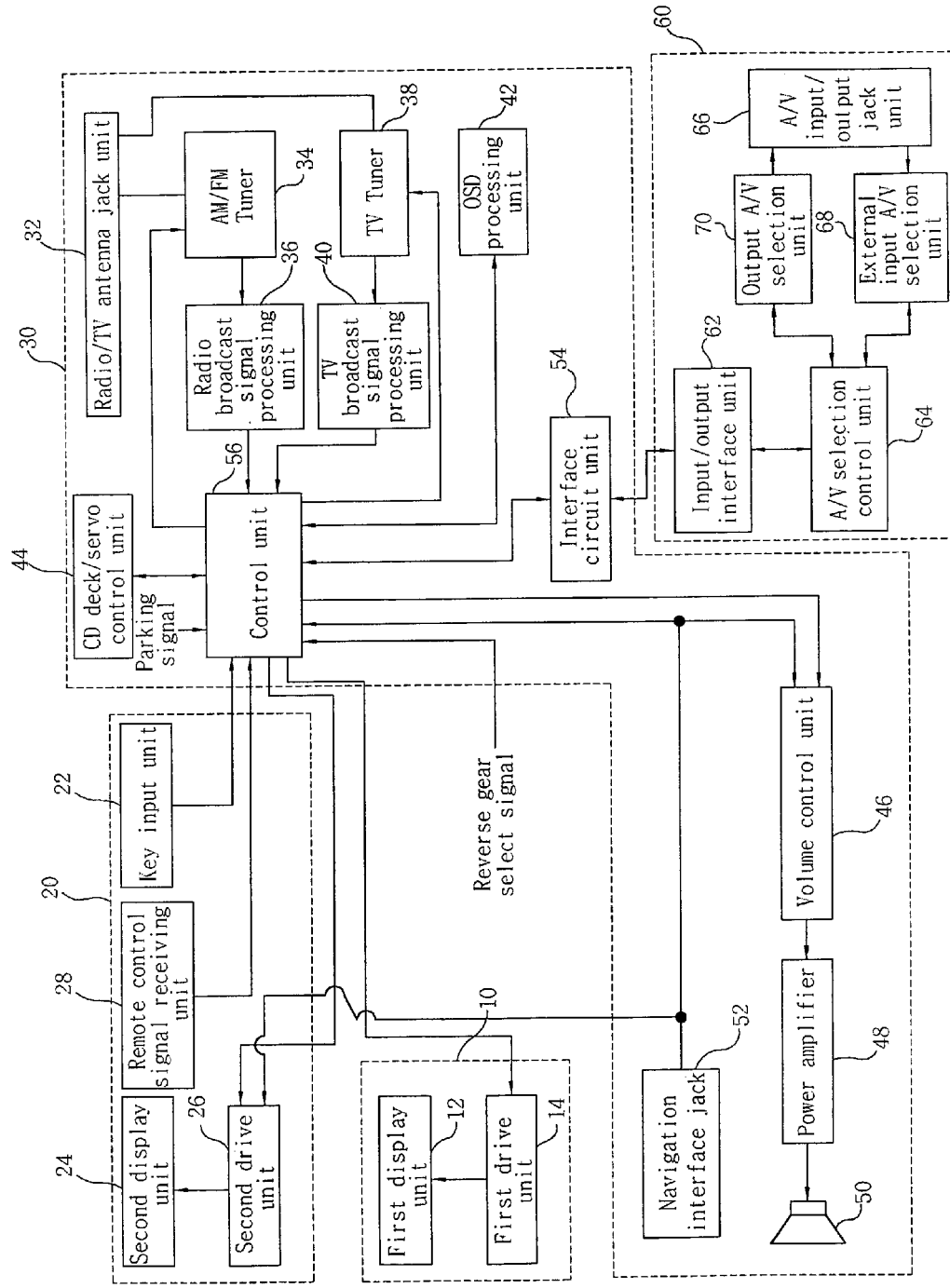
FIG. 1 is a block diagram of a car A/V system according to an embodiment of the present invention.

The car audio/video (A/V) system according to the present invention will be described herein below with reference to the accompanying drawings, in which the same reference numerals are used throughout the different drawings to designate the same or similar components.

FIG. 1 is a block diagram of the car A/V system according to an embodiment of the present invention. As shown in FIG. 1, the car A/V system of the present invention comprises a rear panel 10, a front panel 20, a main unit 30, and an external audio/video (A/V) selecting means 60. The rear panel 10 is provided with a first display unit 12, while the front panel 20 is provided with a plurality of key input elements and a second display unit 24. The key input elements provided on the front panel 20 allow a user to select a desired mode of the A/V system from among a radio mode, a CD mode, a TV mode, and an AUX mode (external input mode), and to input fine adjustment values, a mode change signal and an operation command signal after selecting a desired mode. The main unit 30 is provided with a radio broadcast signal processing unit 36 to process the signals of a radio broadcast channel selected by an AM/FM tuner 34, and a TV broadcast signal processing unit 40 to process the signals of a TV broadcast channel selected by a TV tuner 38. The main unit 30 further includes a CD deck/servo control unit 44 to play a compact disc, on which sound data are recorded, and to reproduce sound, and a control unit 56 to controllably execute an operation corresponding to a specified command signal input by manipulating the key input elements. The external A/V selecting means 60 controls, in conjunction with the control unit 56, the input/output of external input signals transmitted from an external input source.

In the above-mentioned car A/V system, the rear panel 10 has the first display unit 12 made of a TN-type or STN-type LCD panel, and a first drive unit 14 to actuate the first display unit 12. The first display unit 12 displays thereon numerals and symbols that allow the user to confirm the operational status related to one of the selected radio modes and CD modes.

The front panel 20 is provided with a key input unit 22 comprising the plurality of key input elements, and the second display unit 24 which is made of an NTSC-type and PAL-type TFT-LCD panel and uses a CCFL (cold cathode fluorescent lamp) as a back light lamp. The front panel 20 further includes a second drive unit 26 and a remote control signal receiving unit 28. The second drive unit 26 comprises a timing controller IC, a PWM controller, a DC/AC inverter and a video processor, and drives the second display unit 24. The remote control signal receiving unit 28 comprises an infrared sensor that receives a remote control signal output from a remote control means (remote controller, not shown). The second display unit 24, which is installed in the central portion of the front panel 20, displays thereon a moving image that is produced by video signals of a selected TV broadcast channel, a DVD player, a rear view camera, or a game console box, and may further display thereon a moving map produced by a navigation system.

Figure 2:
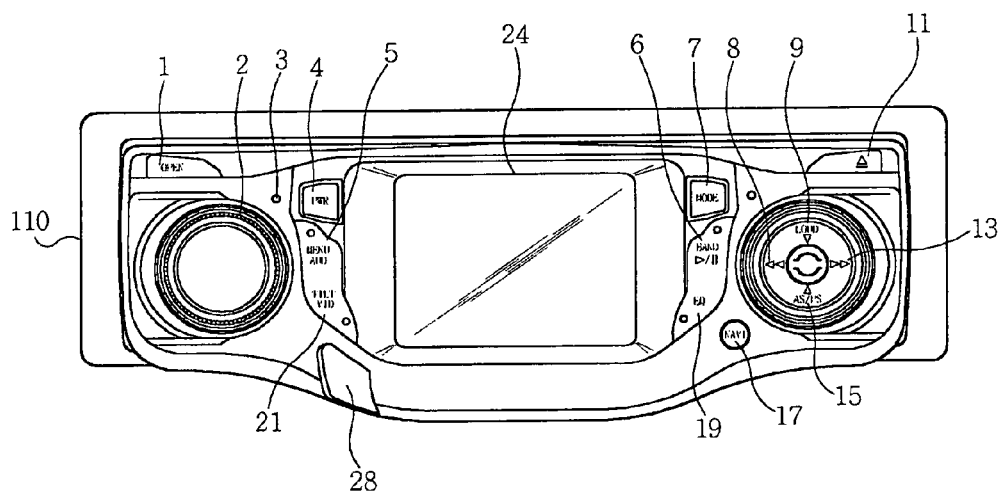
FIG. 2 is a front view illustrating the shape and construction of a front panel shown in FIG. 1.
Figure 3:
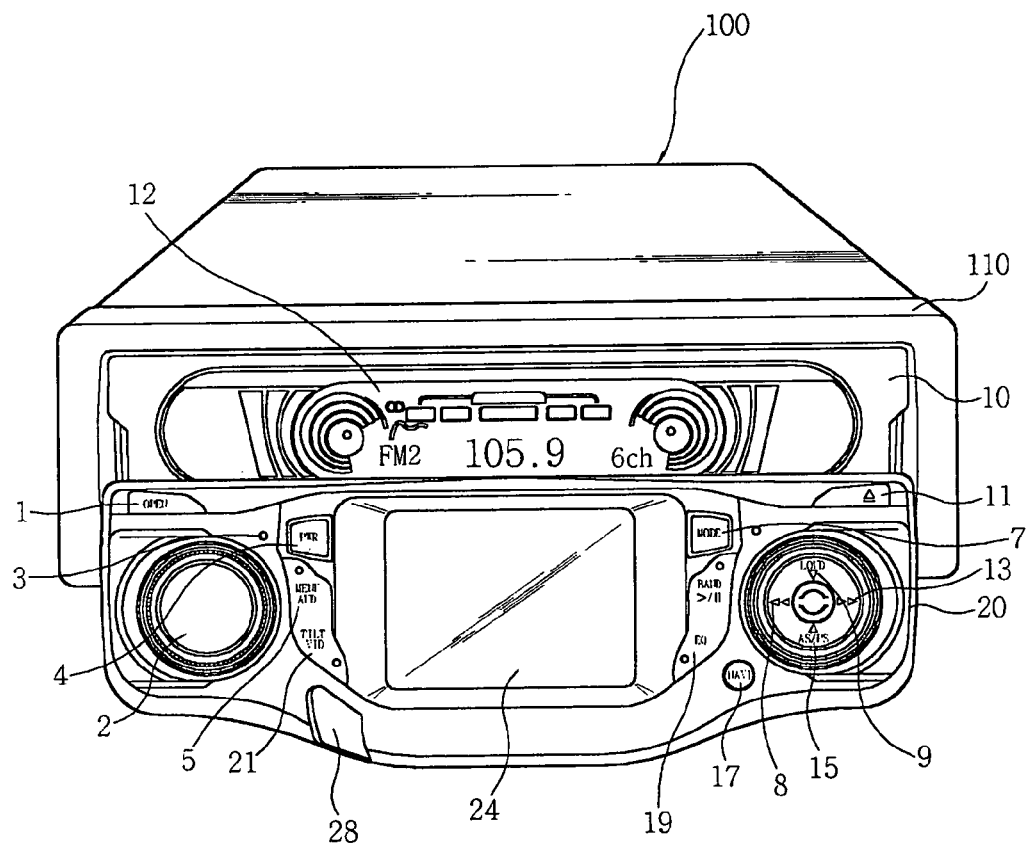
FIG. 3 is a front perspective view illustrating an open state of the front panel, which is opened by the operation of an open button provided on the front panel of FIG. 2.

As shown in FIGS. 2 and 3, the front panel 20 of the A/V system is placed in front of the rear panel 10. Both the rear panel 10 and the front panel 20 are installed in a front frame 110 of a 1-DIN-sized casing 100 of the car A/V system. In the following description of the embodiments of the present invention, the state of the front panel 20 shown in FIG. 2 will be referred to as an initial panel state, and the state shown in FIG. 3 will be referred to as an open panel state.

The key input elements, constituting the key input unit 22, include an open button 1 which can change the state of the front panel 20 from the initial panel state of FIG. 2 to the open panel state of FIG. 3, or from the open panel state to the initial panel state. The key input elements further include a volume control knob 2, a reset button 3, a power button 4, a menu/audio button 5, a band/play/pause button 6, a mode select button 7, a tuning/track-down button 8, a woofer control button 9, an eject button 11, a tuning/track-up button 13, an AS (auto store)/PS (preset scan) button 15, a navigation control button 17, an equalizer button 19, and a tilt/video button 21. The volume control knob 2 controls the volume of sound, and controls a tilting angle of the front panel 20 during a front panel tilting operation. The reset button 3 is used for setting an initial state of the system and resetting the system to the initial state in the case of malfunction of the system. The power button 4 is used for turning on or off the A/V system. The menu/audio button 5 allows the user to select a desired menu from among a variety of audio-related selection menus, such as Volume, Bass, Treble, Balance, Fader and Subwoofer, and/or to select a desired menu from a variety of audio/video-related selection menus, such as Beep, Rear View, Brightness, Contrast, Color, Tint, Screen Saver, Bass Control Center Frequency, Bass Control Q-Factor, and Treble Control Center Frequency. The band/play/pause button 6 is used for selecting a desired frequency band from among an FM1 band, an FM2 band, an FM3 band, an AM1 band, and an AM2 band, or pausing a CD-playing operation or resuming the CD-playing operation in the CD mode. The mode select button 7 allows the user to select a desired mode from AM/FM mode (radio mode), CD mode, TV mode, and AUX mode (external input mode). The tuning/track-down button 8 is used for selecting a desired radio broadcast channel or a desired TV broadcast channel, or returning the pick-up unit of a CD player to the start point of a playing track of a compact disc. The woofer control button 9 is used for adjusting low-frequency sound or controlling the output power of a subwoofer. The eject button 11 inputs a command signal for loading or unloading a compact disc. The tuning/track-up button 13 is used for selecting a desired radio broadcast channel or a desired TV broadcast channel, or skipping the pick-up unit of the CD player to the start point of a track next to the playing track of a compact disc. The AS/PS button 15 is used for adjusting high-frequency sound. The AS/PS button 15 also automatically stores, in system memory, predetermined radio broadcast channels, for example, six channels that output strong radio broadcast signals in an FM1 band, an FM2 band, an FM3 band, an AM1 band and an AM2 band, as well as predetermined TV broadcast channels, for example, six channels that output strong TV broadcast signals in TV broadcast frequency bands, and scan each of the stored channels for a predetermined time period, for example, about five seconds, thus allowing the user to listen to the radio and watch TV on each of the stored channels for the above-mentioned predetermined time period. The navigation control button 17 is used to turn a navigation system (not shown) on or off, while the equalizer button 19 is used to control the output signals of the AM/FM tuner 34 and control the reproduced CD sound. The tilt/video button 21 is used to control the tilting angle of the front panel 20, and to select a desired A/V mode from among a variety of A/V modes, for example, AV1 mode, AV2 mode and V3-CAM mode, which are included in the external input mode.

Although the buttons 8, 9, 13 and 15 are placed on the left end, the right end, the upper end and the lower end of a circular button, respectively, they are independently operated. In addition to the above-mentioned buttons, the key input elements may further include a mute button to mute the sound output through a speaker, and a time display button to display time on a designated display unit. After a desired menu has been selected from among the variety of selection menus by manipulating the menu/audio button 5, fine adjustment values are input by manipulating the volume control knob 2 or the up/down buttons 9 and 15.

Furthermore, although the key input unit 22 and the remote control signal receiving unit 28 of the system are configured as separate units as shown in FIG. 1, the remote control signal receiving unit 28 may be configured as an element included in the key input unit 22, without affecting the functioning of the present invention.

The main unit 30 of the car A/V system of FIG. 1 comprises the AM/FM tuner 34, the radio broadcast signal processing unit 36, the TV tuner 38, the TV broadcast signal processing unit 40, an OSD (On-Screen-Display) processing unit 42, the CD deck/servo control unit 44, the volume control unit 46, a power amplifier 48, a navigation interface jack 52, an interface circuit unit 54, and the control unit 56. The AM/FM tuner 34 is coupled to the radio antenna jack of a radio/TV antenna jack unit 32 and tunes a frequency signal of a radio broadcast channel, which is selected from among various frequencies of radio broadcast channel signals output from various radio broadcasting studios, according to a radio broadcast channel selection signal. The radio broadcast signal processing unit 36 is provided with various circuits, such as an AM/FM RF amplifier, an audio signal processor, etc., required to provide desired audio output power, and receives a signal output from the AM/FM tuner 34, and processes the input signal to make an audio signal appropriate to radio broadcasting, and outputs the processed audio signal. The TV tuner 38 is coupled to the TV antenna jack of the radio/TV antenna jack unit 32 and selects a frequency signal of a TV broadcast channel from among various frequencies of TV broadcast channel signals, output from various TV broadcasting studios, according to a TV broadcast channel selection signal. The TV tuner 38 also changes the selected frequency signal into an intermediate frequency signal. The TV broadcast signal processing unit 40 is provided with an IF amplifier, a video signal processor, an audio signal processor, etc., receives the intermediate frequency signal output from the TV tuner 38, and processes the input signal to make audio/video (A/V) signals appropriate for TV broadcasting, and outputs the processed A/V signals. The OSD processing unit 42 stores therein a plurality of fonts to display required text on the second display unit 24 of the front panel 20 and processes the required text by a control operation of the control unit 56. The CD deck/servo control unit 44 comprises a CD deck mechanism to play a compact disc having sound data recorded thereon and reproduce sound, an RF amplifier to amplify the audio signal output from the CD deck mechanism, a DSP to process the amplified audio signal to make a digital signal, and a motor driver to actuate the deck mechanism. The volume control unit 46 controls the volume level of an audio signal, transmitted to a speaker 50, in response to a control signal output from the control unit 56. The power amplifier 48 amplifies the volume level of the audio signal, output from the volume control level 46, to a predetermined level and transmits the audio signal having the amplified volume level to the speaker 50. The navigation interface jack 52 is connected to a navigation system. The interface circuit unit 54 interfaces the control unit 56 with the external audio/video selecting means 60, so that the control unit 56 transmits and receives information and control signals to and from the external audio/video selecting means 60. The control unit 56 controls the operation of the car A/V system.

Although a single speaker 50 is shown in the block diagram of FIG. 1, it should be understood that the car A/V system of the present invention may have four speakers which are placed at left and right sides of the front and rear parts of the passenger compartment of a car equipped with the A/V system.

Furthermore, in the above description, the main unit 30 is configured such that it plays compact discs (CD). However, the main unit 30 may be configured such that it plays CD-R and CD-RW. In the above case, the main unit 30 must be provided with a CD player capable of playing the CD-R and CD-RW.

The external audio/video selecting means 60 comprises an input/output interface unit 62, an A/V selection control unit 64, an A/V input/output jack unit 66, an external input A/V selection unit 68, and an output A/V selection unit 70. The input/output interface unit 62 is coupled to the interface circuit unit 54, so that the input/output interface unit 62 transmits and receives information and control signals to and from the interface circuit unit 54. The A/V selection control unit 64 cooperates with the control unit 56 via both the input/output interface unit 62 and the interface circuit unit 54 and selects external A/V signals transmitted from an external input source and controls the input/output of the external A/V signals. The A/V input/output jack unit 66 comprises an A/V output jack and an A/V input jack that is connected to an external input source, such as a DVD player, a game console box, a VCP (video cassette player), or a rear view camera. The external input A/V selection unit 68 selects an A/V signal of an external input source from the A/V signals of a plurality of external input sources input through the A/V input jack of the A/V input/output jack unit 66, according to a control signal output from the A/V selection control unit 64. The output A/V selection unit 70 selects the output A/V signal, according to a control signal output from the A/V selection control unit 64, and outputs the selected A/V signal to the A/V output jack of the A/V input/output jack unit 66.

Although there is no power supply shown in the main unit 30 and the external audio/video selecting means 60 of FIG. 1, it should be understood that a power supply (SMPS) must be used in the car A/V system. The voltage of a power supply equipped in a car may vary greatly according to operating conditions, so that the power supply for the car A/V system preferably comprises a constant voltage circuit of DC 12V, 8V or 5V.

In the car A/V system of the present invention, both the rear panel 10 and the front panel 20 may be tilted by the operation of a conventional tilt mechanism (not shown), which is controlled by a control signal output from the control unit 56.

The tilt mechanism, which opens a panel having a plurality of control buttons and display units by tilting the panel, is well-known to those skilled in the art of the car A/V systems, and may be variously embodied, so that a detailed explanation of the tilt mechanism is deemed unnecessary.

In an effort to allow those skilled in the art to more easily comprehend the construction of the present invention, an example of a tilt mechanism is outlined as follows. The tilt mechanism may comprise a plurality of motors, a plurality of gear mechanisms to transmit the rotational forces of the motors while reducing the rotational speeds and changing the rotational force transmission directions, and a plurality of lever mechanisms to move and rotate the panels using the rotational forces transmitted through the gear mechanisms.

The tilting operation of tilting the rear panel 10 and the front panel 20 according to different embodiments of the present invention will be described schematically herein below.

Figure 4:
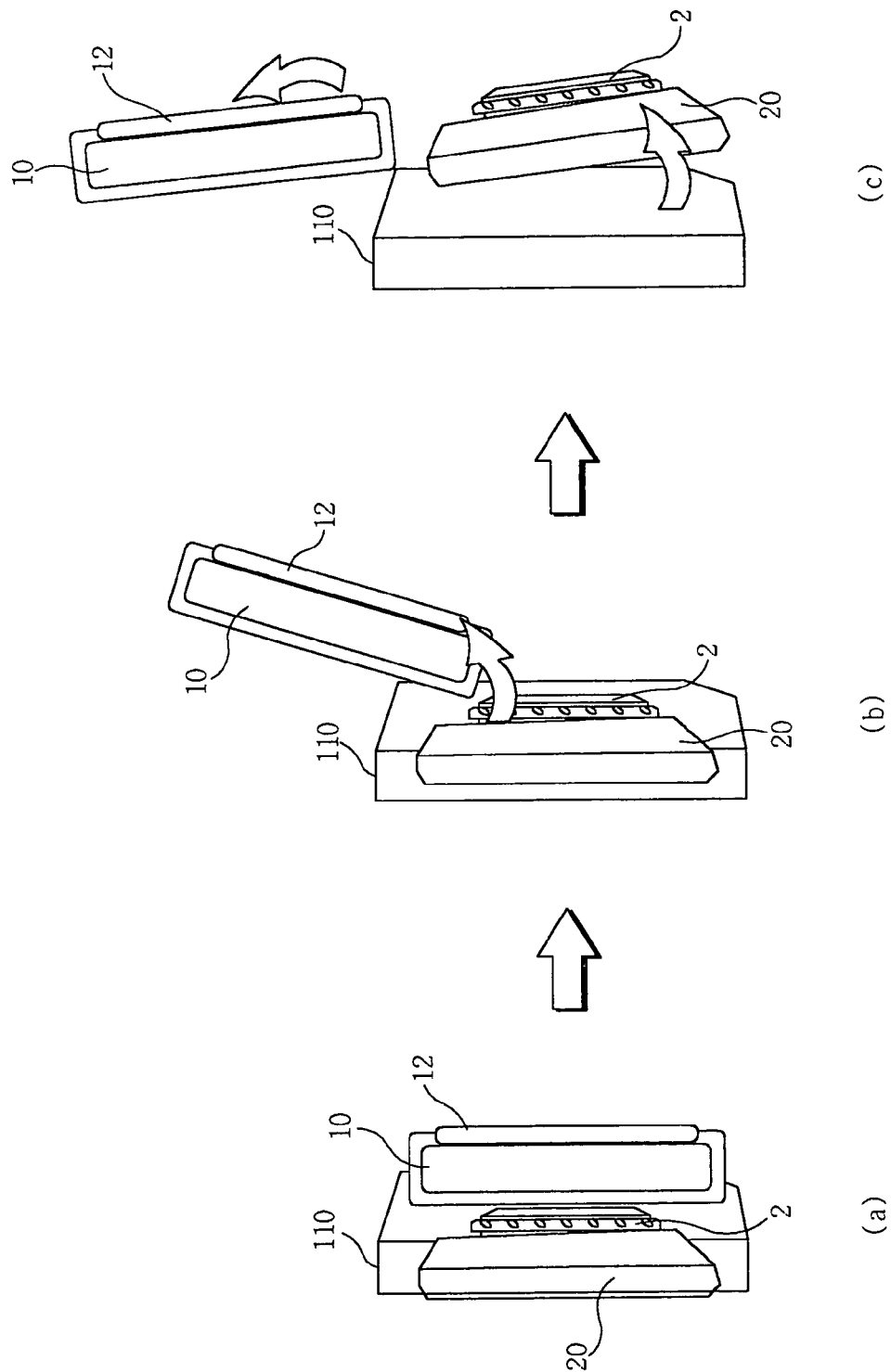
FIGS. 4a through 4c are views schematically illustrating a panel opening operation according to a first embodiment of the present invention.

FIGS. 4a through 4c are views schematically illustrating a panel opening operation according to a first embodiment of the present invention. In the initial panel state shown in FIG. 4a, the front panel 20 is installed in the front frame 110 such that the volume control knob 2 of the front panel 20 is placed to face forwards. The rear panel 10 is installed in the front frame 110 at a position in front of the front panel 20 such that the first display unit 12 of the rear panel 10 is placed to face forwards.

When the open button 1 in the above-mentioned initial panel state is pushed by a user, the rear panel 10 moves upward with an upward tilting motion as shown in FIG. 4b. Thereafter, the front panel 20 protrudes forward from the front frame 110 to a predetermined distance and is maintained at a position below the rear panel 10 while being tilted at the same tilting angle as that of the tilted rear panel 10, as shown in FIG. 4c. The state of the rear and front panels 10 and 20 shown in FIG. 4c is referred to as an open panel state.

Figure 5:
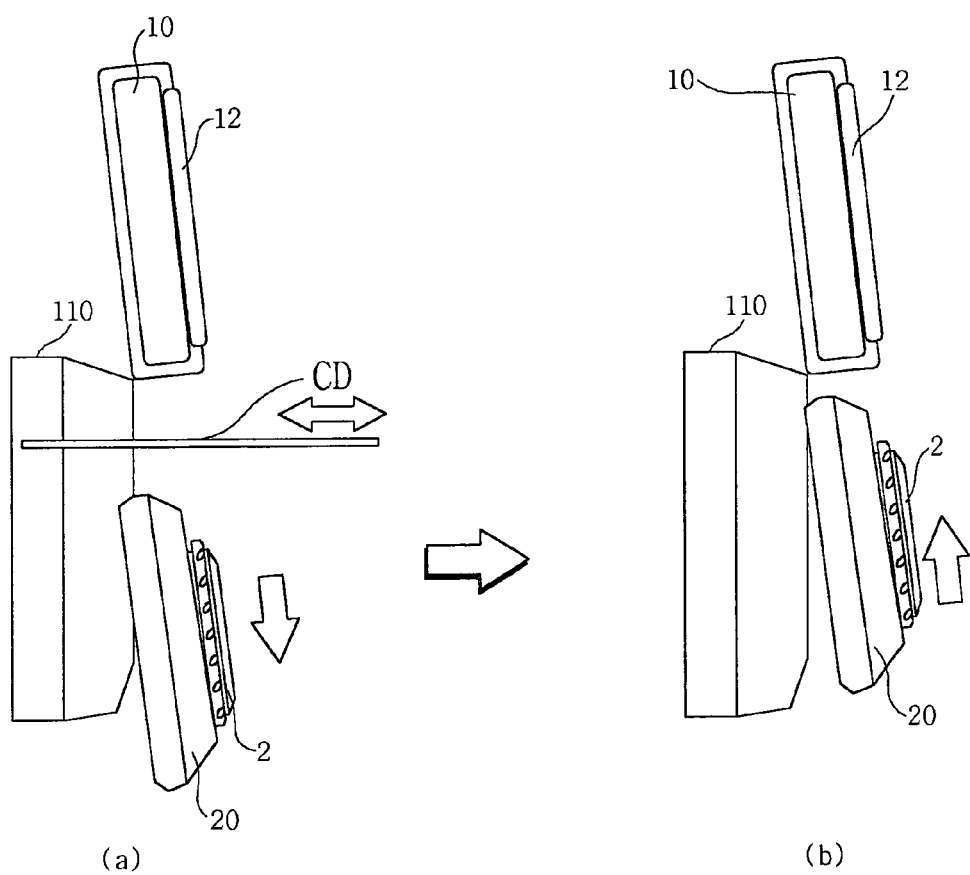
FIGS. 5a and 5b are views schematically illustrating a CD loading/unloading operation according to the first embodiment of the present invention.

FIGS. 5a and 5b are views schematically illustrating a CD loading/unloading operation according to the first embodiment of the present invention. When the eject button 11 in the open panel state is pushed by the user, only the tilted front panel 20 moves downward by a predetermined distance as shown in FIG. 5a, so that a CD loading/unloading slot provided in the front frame 110 is exposed to the outside.

Thus, a compact disc (CD) can be automatically unloaded from the CD deck. Of course, to load a CD into the CD loading/unloading slot, it is required to expose the CD loading/unloading slot to the outside by pushing the eject button 11, as shown in FIG. 5a, prior to loading the CD into the slot.

When the loading/unloading of the compact disc (CD) has been completed, the front panel 20 automatically restores its previous state (or the open panel state of FIG. 4c) as shown in FIG. 5b.

FIGS. 6a through 6d are views schematically illustrating a panel opening operation according to a second embodiment of the present invention. In the initial panel state shown in FIG. 6a, the rear panel 10 is installed in the front frame 110 such that the first display unit 12 of the rear panel 10 is placed to face outwards. The front panel 20 is installed in the front frame 110 at a position in front of the rear panel 10 such that the volume control knob 2 of the front panel 20 is placed to face the first display unit 12.

Figure 6:
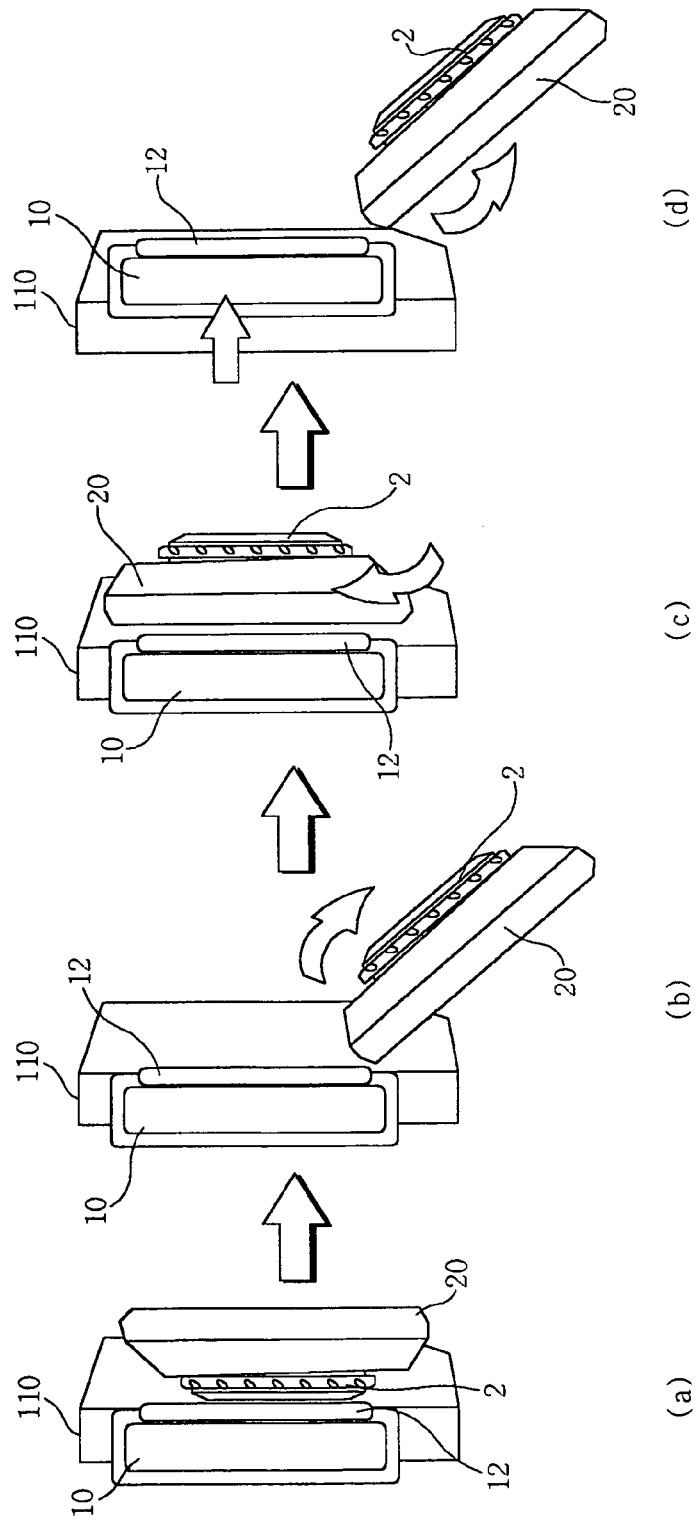
FIGS. 6a through 6d are views schematically illustrating a panel opening operation according to a second embodiment of the present invention.

When the open button 1 in the initial panel state is pushed by a user, the front panel 20 is rotated outward and downward around a lower joint thereof at an angle of about 270 degrees, as shown in FIG. 6b, and then moves upward to be placed in front of the rear panel 10 and cover the front of the front frame 110, as shown in FIG. 6c.

Thereafter, as shown in FIG. 6d, the front panel 20 moves downward and is maintained at a position which is tilted at a predetermined tilting angle (monitor watching angle), while the rear panel 10 moves forward a predetermined distance in the front frame 110. The state of the rear and front panels 10 and 20 shown in FIG. 6d is referred to as an open panel state.

Figure 7:
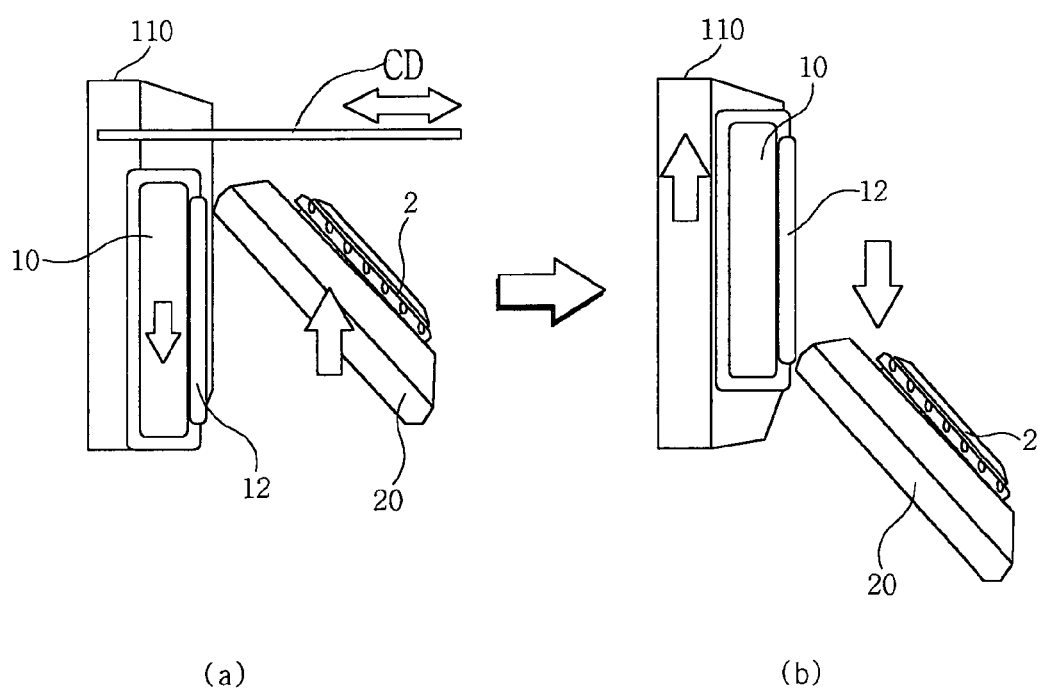
FIGS. 7a and 7b are views schematically illustrating a CD loading/unloading operation according to the second embodiment of the present invention.

FIGS. 7a and 7b are views schematically illustrating a CD loading/unloading operation according to the second embodiment of the present invention. In the open panel state, when the eject button 11 is pushed by the user, the rear panel 10 moves downward by a predetermined distance as shown in FIG. 7a, so that a CD loading/unloading slot provided in the front frame 110 is exposed to the outside. Furthermore, to allow the user to more conveniently execute the CD loading/unloading operation, the front panel 20 in the open panel state moves upward by a predetermined distance.

Thus, a compact disc (CD) can be automatically unloaded from the CD deck. Of course, to load a CD into the CD loading/unloading slot, it is required to expose the CD loading/unloading slot to the outside by pushing the eject button 11, as shown in FIG. 7a, prior to loading the CD into the slot.

When the loading/unloading of the compact disc (CD) has been completed, the rear panel 10 and the front panel 20 automatically restore their previous states (or the open panel state of FIG. 6d) as shown in FIG. 7b.

Figure 8:
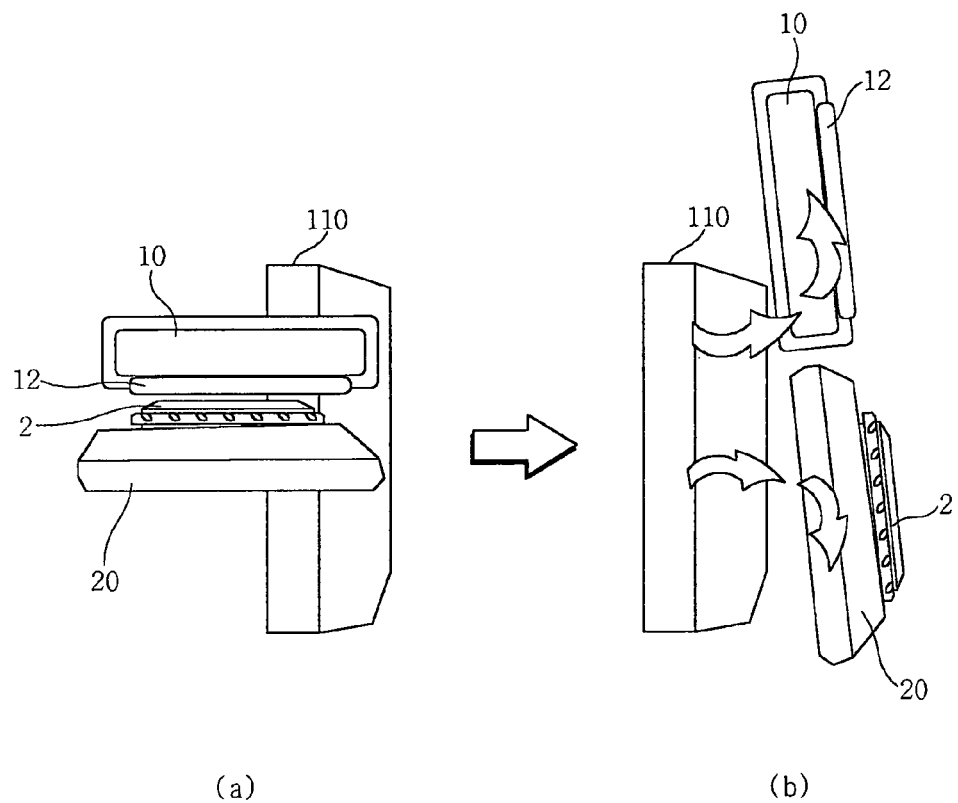
FIGS. 8a and 8b are views schematically illustrating a panel opening operation according to a third embodiment of the present invention.

FIGS. 8a and 8b are views schematically illustrating a panel opening operation according to a third embodiment of the present invention. In the initial panel state shown in FIG. 8a, the rear panel 10 is installed horizontally in the front frame 110 such that the first display unit 12 of the rear panel 10 is placed to face downward. The front panel 20 is installed horizontally in the front frame 110 such that the volume control knob 2 of the front panel 20 is placed to face the first display unit 12.

In the initial panel state, when the open button 1 is pushed by a user, both the rear panel 10 and the front panel 20 move forward by predetermined distances in the front frame 110. When the rear panel 10 and the front panel 20 have moved forward by the predetermined distances in the front frame 110, the rear panel 10 is rotated upward and outward around a lower joint thereof and is maintained at a position which is tilted at a predetermined tilting angle in front of the upper portion of the front frame 110, while the front panel 20 is rotated outward and downward around an upper joint thereof and is maintained at a position which is tilted at a predetermined tilting angle in front of the lower portion of the front frame 110, as shown in FIG. 8b.

In other words, the rear panel 10 and the front panel 20 are placed in front of the front frame 110 while being tilted at the same tilting angle. The state of the rear and front panels 10 and 20 shown in FIG. 8b is referred to as an open panel state.

Figure 9:
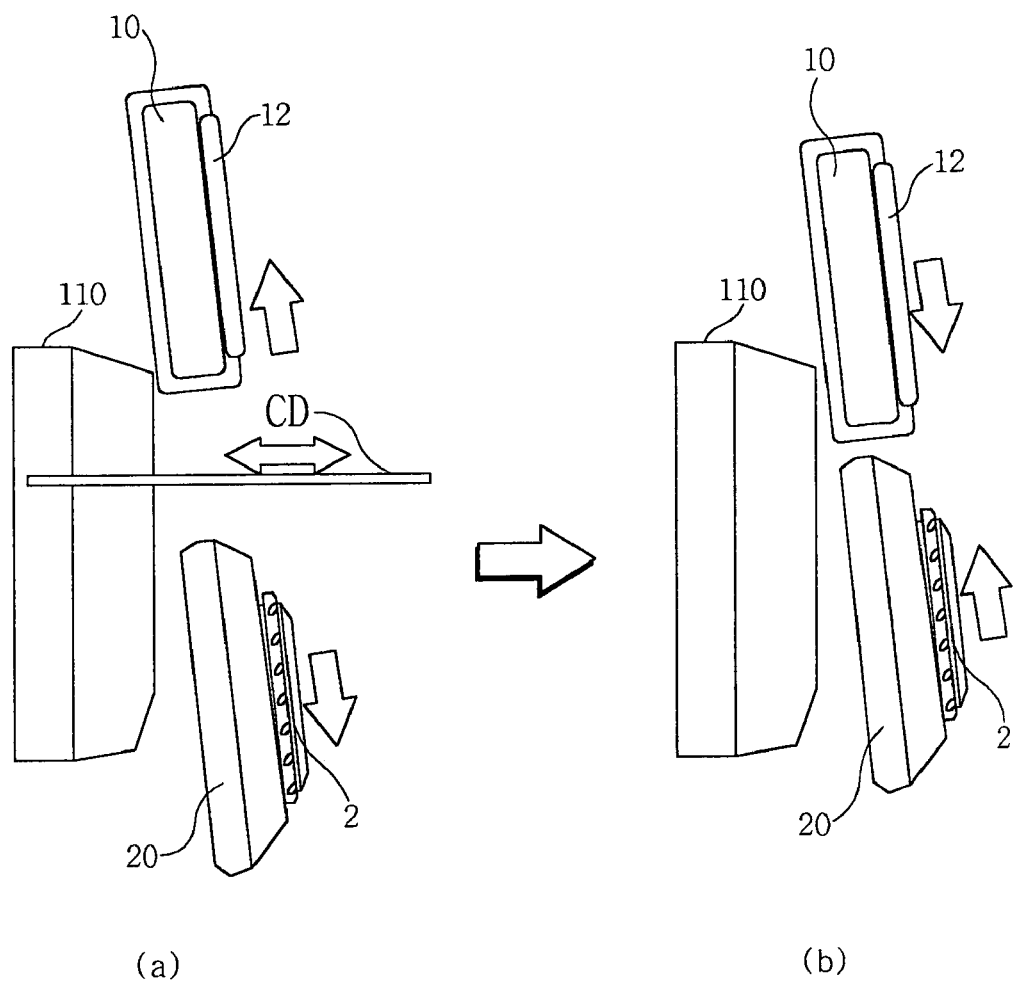
FIGS. 9a and 9b are views schematically illustrating a CD loading/unloading operation according to the third embodiment of the present invention.

FIGS. 9a and 9b are views schematically illustrating a CD loading/unloading operation according to the third embodiment of the present invention. When the eject button 11 in the open panel state is pushed by the user, the rear panel 10 moves upward by a predetermined distance, while the front panel 20 moves downward by a predetermined distance, as shown in FIG. 9a.

Thus, a CD loading/unloading slot that is provided in the front frame 110 is exposed to the outside, so that a compact disc (CD) can be automatically unloaded from the CD deck.

Of course, to load a CD into the CD loading/unloading slot, it is required to expose the CD loading/unloading slot to the outside by pushing the eject button 11, as shown in FIG. 9a, prior to loading the CD into the slot. When the loading/unloading of the compact disc (CD) has been completed, the rear panel 10 and the front panel 20 automatically restore their previous states (or the open panel state of FIG. 8b) as shown in FIG. 9b.

In the present invention, the drive mechanism to open the front and rear panels and to load or unload a compact disc (CD) into or from the car A/V system may be freely configured without being limited to the above-mentioned mechanisms if the drive mechanism can be used in the 1-DIN-sized car A/V system. Furthermore, although the above-mentioned drive mechanism is configured such that it loads or unloads a compact disc (CD), the drive mechanism may be configured to load or unload a CD-R or a CD-RW in the same manner as that described for the operation of loading and unloading the CD.

Particularly, during the operation of the car A/V system, the control unit 56 of the main unit 30 directs the A/V system to execute the radio function, the CD playing function, the navigation function, or the TV function according to a key input signal transmitted from the key input unit 22 of the front panel 20. Furthermore, when the control unit 56 receives an external input mode (AUX mode) selection signal from the key input unit 22, the control unit 56 operates in conjunction with the external audio/video selecting means 60 and receives A/V signals from an external input source, such as a DVD player, a VCP, a game console box, or a rear view camera, and outputs the input A/V signals.

Herein below, some specified control operations of the control unit 56 will be described without describing the operation of well-known controls of the control unit 56.

In the following description, the modes which can be executed by the car A/V system include radio mode (AM/FM mode), CD mode, TV mode and external input mode (AUX mode). The external input mode (AUX mode) includes A/V modes which are AV1 mode, AV2 mode and V3-CAM mode. The control unit is configured such that it receives an A/V signal from the DVD player in the AV1 mode, receives an A/V signal from the VCP in the AV2 mode, and receives a video signal from the rear view camera in the V3-CAM mode. The external input mode (AUX mode) can be selected from any mode except for the TV mode. Furthermore, a navigation system is connected to the navigation interface jack 52 of the main unit 30.

First, when a driver or a passenger in a car equipped with the car A/V system pushes the navigation control button 17 once to receive road guidance information while he/she is listening to the radio on a desired radio broadcast channel selected by manipulating the key input unit 22 which selected the radio mode (AM/FM mode), the control unit 56 controls the A/V system such that real-time variable map information (information in RGB signal form) output from the navigation system through the navigation interface jack 52 is transmitted to the second drive unit 26 of the front panel 20. The second drive unit 26 processes the input map information in real time and displays the processed map information on the second display unit 24. In this case, the rear panel 10 and the front panel 20 are in one of the open panel states shown in FIG. 3, FIG. 4c, FIG. 6d and FIG. 8b.

When the car has reached a specified position on a road, for example, a curve five hundred meters ahead, while the driver drives the car and listens to the radio through the speaker 50, a road guidance message signal (audio message signal) is transmitted from the navigation system through the navigation interface jack 52 to the speaker 50 as directed by the control unit 56, so that the speaker 50 outputs a road guidance message. The control unit 56 temporarily mutes the sound of the radio broadcast channel while the speaker 50 outputs the road guidance message.

Second, when a mode conversion signal for converting the operational mode into the TV mode has been input without any input signal of turning the navigation system off after selecting the navigation mode during the radio mode, the control unit 56 receives the signal of a TV broadcast channel, which was preset as a default, or the signal of another TV broadcast channel, which was previously selected and watched by the passenger, from the TV broadcast signal processing unit 40. Thus, the audio signal of the TV broadcast channel is output through the speaker 50, while the video signal of the TV broadcast channel is output through the second display unit 24 of the front panel 20. In the above case, although map information is not displayed on the second display unit 24, the navigation system continues its operation. Thus, when it is time to output a road guidance message because the car has reached a specified position on the road, for example, a curve five hundred meters ahead, the control unit 56 temporarily mutes the sound of the TV broadcast channel which is output through the speaker 50, and then, outputs the road guidance message (audio message) through the speaker 50. In the present invention, the control unit 56 preferably controls the car A/V system such that the video signal of the TV broadcast channel is output only when the car is parked.

Third, when a preset scan command signal has been input without any input signal for turning the navigation system off after selecting the navigation mode during the radio mode, the control unit 56 sequentially receives the broadcast signals of preset broadcast channels (radio broadcast channels and/or TV broadcast channels) from the radio broadcast signal processing unit 36 and/or the TV broadcast signal processing unit 40 and outputs the input broadcast signals to the second drive unit 26 and/or the speaker 50 for a predetermined time period, for example, about five seconds, for each broadcast channel. If the second drive unit 26 sequentially receives the video signals of the TV broadcast channels, the second drive unit 26 sequentially displays the video images of the TV broadcast channels on the second display unit 24 for a predetermined time period for each TV broadcast channel. Furthermore, the control unit 56 sequentially outputs the audio signals of the radio broadcast channels and/or the TV broadcast channels through the speaker 50 for a predetermined time period, for example, about five seconds, for each broadcast channel. If no broadcast channel selection signal has been input until the preset scan mode is terminated, the control unit 56 directs the A/V system to enter a previously operated mode after the preset scan mode has been terminated.

Fourth, when the driver or the passenger in the car pushes the navigation control button 17 once to receive road guidance information while he/she is listening to a CD output through the speaker 50 in the CD mode which was selected by manipulating the key input unit 22, the control unit 56 controls the A/V system such that map information output from the navigation system through the navigation interface jack 52 is transmitted to the second drive unit 26 of the front panel 20. The second drive unit 26 processes the input map information data and displays the processed map information on the second display unit 24. In this case, the speaker 50 continues to output the CD sound.

When the car has reached a specified position on a road, for example, a curve five hundred meters ahead, while the driver drives the car and listens to the CD sound through the speaker 50, a road guidance message signal (audio message signal) is transmitted from the navigation system through the navigation interface jack 52 to the speaker 50 as directed by the control unit 56, so that the speaker 50 outputs a road guidance message. The control unit 56 temporarily mutes the CD sound while the speaker 50 outputs the road guidance message.

The above-mentioned road guidance service executed by the navigation system can be performed during the radio mode, the TV mode, the CD mode, and the external input mode (AUX mode). The road guidance service of the navigation system is stopped by continuously pushing the navigation control button 17 for two or more seconds. In the TV mode, the video signal of a selected TV broadcast channel is output through the second display unit 24, while the audio signal of the selected TV broadcast channel is output through the speaker 50. Thus, it is impossible to convert the mode of the A/V system between the AV1 mode, the AV2 mode and the V3-CAM mode if the tilt/video button 21 is first manipulated without executing mode conversion by manipulating the mode select button 7.

Furthermore, the car A/V system can display a DVD image or a navigation map image on the second display unit 24 of the front panel 20 during radio mode or CD mode operation. To change a DVD image on the display unit 24 into a navigation map image, or to change a navigation map image on the display unit 24 into a DVD image, the navigation control button 17 must be manipulated.

Furthermore, the car A/V system may be controlled such that the audio signal of the navigation system can be output through one speaker located near the driver's seat or through all of the speakers placed in the passenger compartment of the car. When the driver or the passenger in the car pushes the woofer control button 9 while holding the navigation control button 17, the control unit 56 controls the A/V system such that the audio signal of the navigation system is output through the speaker located at the left side of the front part of the passenger compartment. In the above state, the control unit 56 also outputs a command signal to the OSD processing unit 42 so that the OSD processing unit 42 produces OSD (On-Screen-Display) letters representing the situation. The control unit 56 receives an OSD letter signal indicative of the OSD letters from the OSD processing unit 42, and outputs the OSD letter signal to the second drive unit 26, thus displaying the OSD letters (for example, "NAVI LF CH") on the second display unit 24. When the driver or the passenger in the car pushes the woofer control button 9 once more while holding the navigation control button 17, the control unit 56 controls the A/V system such that the audio signal of the navigation system is output through all of the speakers placed in the passenger compartment. In the above state, the control unit 56 also outputs a command signal to the OSD processing unit 42 so that the OSD processing unit 42 produces OSD letters representing the situation. The control unit 56 receives an OSD letter signal indicative of the OSD letters from the OSD processing unit 42, and outputs the OSD letter signal to the second drive unit 26, thus displaying the OSD letters (for example, "NAVI ALL") on the second display unit 24.

Fifth, when the control unit 56 receives a reverse gear select signal, the control unit 56 outputs a command signal to the OSD processing unit 42 so that the OSD processing unit 42 produces OSD letters informing the user of the V3-CAM mode. The control unit 56 receives an OSD letter signal indicative of the OSD letters from the OSD processing unit 42, and outputs the OSD letter signal to the second drive unit 26, thus displaying the OSD letters, which are V3-CAM MODE, on a predetermined position of the second display unit 24. Furthermore, the control unit 56 outputs a signal to the A/V selection control unit 64 through both the interface circuit unit 54 and the input/output interface unit 62, thus informing the A/V selection control unit 64 of the A3-CAM mode. In response to the signal output from the control unit 56, the A/V selection control unit 64 commands the external input A/V selection unit 68 to select an image produced by the rear view camera. Upon receiving the command signal from the control unit 56, the external input A/V selection unit 68 selects an image produced by the rear view camera via the A/V input jack of the A/V input/output jack unit 66, and outputs the selected image produced by the rear view camera to the A/V selection control unit 64. The A/V selection control unit 64 outputs the input image produced by the rear view camera to the control unit 56 via both the input/output interface unit 62 and the interface circuit unit 54. Thus, the control unit 56 controls the second drive unit 26 and displays the image produced by the rear view camera on the second display unit 24.

The car A/V system according to the present invention can display the image, produced by the rear view camera, while inverting the image. In other words, when the image produced by the rear view camera is displayed on the second display unit 24 unchanged, the left and right of the displayed image are opposite to those of the actual image (real image) of the area behind the car so that the driver may not clearly grasp the situation of the area behind the car. In an effort to avoid the above-mentioned problem, the control unit 56 outputs an image inversion command signal to the second drive unit 26 when transmitting the image produced by the rear view camera to the second drive unit 26. In response to the image inversion command signal, the second drive unit 26 displays the input image produced by the rear view camera on the second display unit 24 while inverting the image left to right, thus allowing the driver to clearly view an image that is in keeping with the actual image of the area behind the car. However, if the rear view camera used with the car A/V system is provided with an image inversion function and can output a produced image while inverting the image left to right, it is not necessary for the control unit 56 to output the image inversion command signal. Thus, the driver can turn the image inversion function on or off according to the arrangement of the view of the area behind the car, which is displayed on the second display unit 24.

Figure 10:
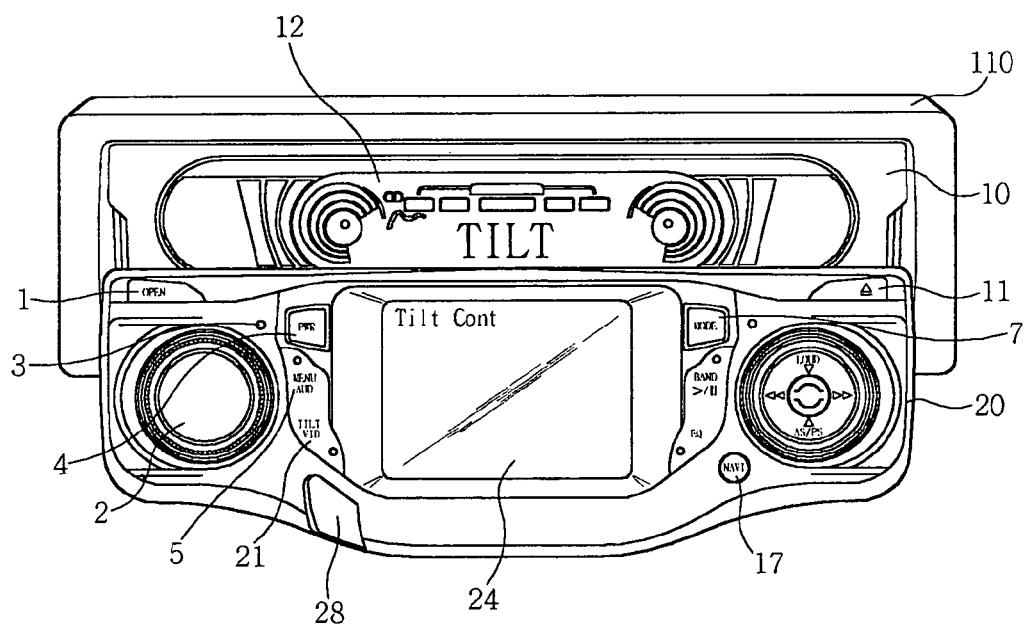
FIG. 10 is a front view illustrating an example of information characters related to a panel tilting operation; which are displayed on the front panel according to the present invention.

Sixth, the operation of tilting the front panel 20 will be described herein below. When the driver or the passenger in the car continuously pushes the tilt/video button 21 of the key input unit 22 for two or more seconds so as to adjust the tilting angle (monitor watching angle) of the front panel 20, the control unit 56 commands the OSD processing unit 42 to produce tilt-related OSD letters. In response to a command signal output from the control unit 56, the OSD processing unit 42 produces tilt-related first OSD letters to be displayed on the first display unit 12 of the rear panel 10 and tilt-related second OSD letters to be displayed on the second display unit 24 of the front panel 20, and outputs OSD letter signals respectively indicative of the two types of tilt-related OSD letters to the control unit 56. Upon receiving the OSD letter signals, the control unit 56 outputs the OSD letter signals to the first drive unit 14 and the second drive unit 26, respectively. In response to the input OSD letter signals, the first drive unit 14 displays the tilt-related first OSD letters (for example, "TILT") on the first display unit 12, while the second drive unit 26 displays the tilt-related second OSD letters (for example, "Tilt Cont") on the second display unit 24 (see FIG. 10).

Figure 11:
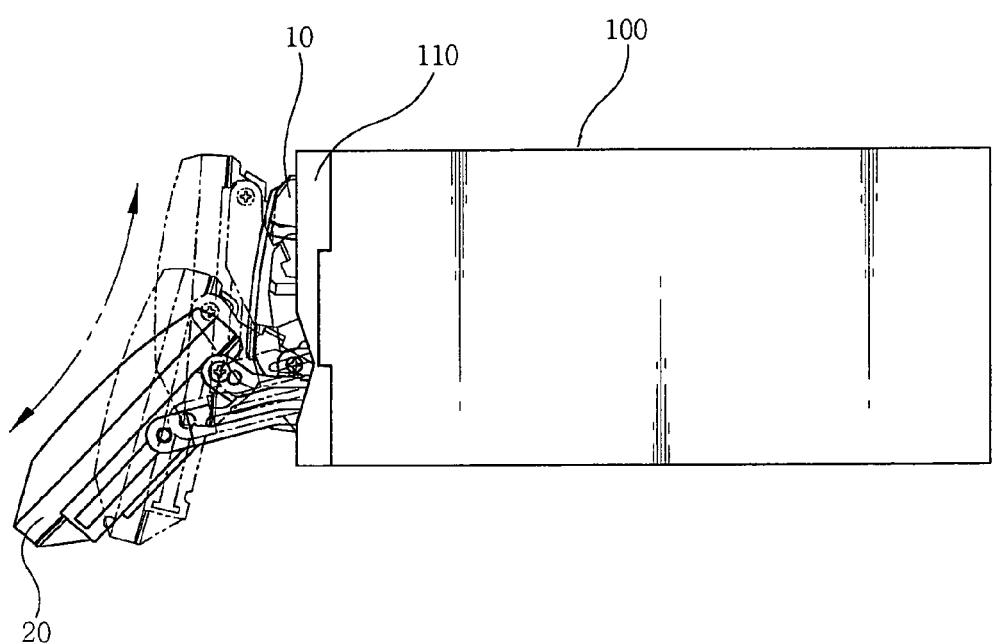
FIG. 11 is a side view illustrating a process of the panel tilting operation of the front panel shown in FIG. 3.

In the above-mentioned state, when the driver or the passenger rotates the volume control knob 2 of the front panel 20 clockwise or counterclockwise, the control unit 56 determines a tilting angle adjustment value according to the rotating direction and rotating angle of the volume control knob 2, and outputs the determined tilting angle adjustment value to the drive mechanism (not shown). Upon receiving the tilting angle adjustment value, the drive mechanism tilts the front panel 20 upward or downward at a predetermined angle from the current tilted position, based on the input tilting angle adjustment value (see FIG. 11).

The tilting angle adjustment value can be input by manipulating the up/down buttons (button 15 acting as the up button and button 9 acting as the down button) as well as the volume control knob 2. Furthermore, when a tilting angle adjustment value has not been input for a predetermined time period, for example, about five seconds or more, the control unit 56 maintains the front panel 20 at the new tilted position. When the eject button 11 is pushed in the state wherein the front panel 20 has been tilted to an adjusted tilting angle and maintained at an angle suitable for viewing the monitor, both the rear panel 10 and the front panel 20 execute one of the sets of motions shown in FIGS. 5a and 5b, FIGS. 7a and 7b, and FIGS. 9a and 9b, prior to restoring their open panel state.

As described above, the present invention provides a car audio/video system in which both a rear panel informing a user of a variety of operational statuses of the car A/V system and a front panel having a TFT-LCD panel capable of displaying a moving image are movably installed in a 1-DIN-sized casing, and which thus smoothly and compositely executes radio mode, CD mode, TV mode, external input mode and road guidance service mode, thereby enlarging the range of use and improving the efficiency of space usage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A car audio/video system, comprising:
a rear panel provided with a first display unit;
a front panel provided with a plurality of key input elements and a second display unit; and
control means for executing an operation corresponding to a specified command signal input by manipulating the key input elements,
wherein both the front panel and the rear panel are installed in front of a casing of the system such that the front panel is placed in front of the rear panel and both the front panel and the rear panel are tilted as directed by the control means and are opened forward from the front of the casing, and
wherein the plurality of key input elements includes a tilt button, so that, when the tilt button is manipulated, the control means controls a tilting motion of the front panel based on an input tilting angle adjustment value.

2. The car audio/video system as set forth in claim 1, wherein the control means comprises a tilt mechanism to tilt the front panel and the rear panel, the tilt mechanism comprising:
at least one motor; a plurality of gear mechanisms to transmit a rotational force of the motor while reducing a rotational speed and changing a rotational force transmission direction; and a plurality of lever mechanisms to move and rotate the front panel and the rear panel using the rotational force transmitted through the gear mechanisms.

3. A car audio/video system, comprising:
a rear panel provided with a first display unit;
a front panel provided with a plurality of key input elements and a second display unit, the key input elements being used to select a desired mode from among a radio mode, an optical disc mode and a TV mode, and to input fine adjustment values, a mode change signal and an operation command signal in a selected mode; and
a main unit comprising: radio broadcast signal processing means for processing a signal of a radio broadcast channel selected by an AM/FM tuner; TV broadcast signal processing means for processing a signal of a TV broadcast channel selected by a TV tuner; optical disc playing means for playing an optical disc having sound data recorded thereon and reproducing sound; and control means for executing an operation corresponding to a specified command signal input by manipulating the key input elements,
wherein both the front panel and the rear panel are installed in front of a casing of the system such that the front panel is placed in front of the rear panel and both the front panel and the rear panel are moved as directed by the control means, and
wherein the plurality of key input elements includes a tilt button, so that, when the tilt button is manipulated, the control means controls a tilting motion of the front panel based on an input tilting angle adjustment value.

4. The car audio/video system as set forth in claim 3, wherein the second display unit is placed on a central portion of the front panel and is made of a TFT (thin film transistor)-LCD (liquid crystal display) panel having a predetermined size.

5. The car audio/video system as set forth in claim 3, wherein the first display unit displays thereon numerals and symbols to confirm a variety of operational statuses, while the second display unit displays thereon a moving image and a real-time variable map image.

6. A car audio/video system, comprising:

a rear panel provided with a first display unit;

a front panel provided with a plurality of key input elements and a second display unit, the key input elements being used to select a desired mode from among a radio mode, an optical disc mode, a TV mode and an external input mode, and to input fine adjustment values, a mode change signal and an operation command signal in a selected mode;

a main unit comprising: radio broadcast signal processing means for processing a signal of a radio broadcast channel selected by an AM/FM tuner; TV broadcast signal processing means for processing a signal of a TV broadcast channel selected by a TV tuner; optical disc playing means for playing an optical disc having sound data recorded thereon and reproducing sound; and control means for executing an operation corresponding to a specified command signal input by manipulating the key input elements; and external audio/video selecting means for controlling, in conjunction with the control means, the input/output of external input signals transmitted from an external input source, wherein both the front panel and the rear panel are installed in front of a casing of the system such that the front panel is placed in front of the rear panel and both the front panel and the rear panel are moved as directed by the control means, and wherein the plurality of key input elements includes a tilt button, so that, when the tilt button is manipulated, the control means controls a tilting motion of the front panel based on an input tilting angle adjustment value.

7. The car audio/video system as set forth in claim 6, wherein the second display unit is placed on a central portion of the front panel and is made of a TFT (thin film transistor)-LCD (liquid crystal display) panel having a predetermined size.

8. The car audio/video system as set forth in claim 6, wherein the first display unit displays thereon numerals and symbols to confirm a variety of operational statuses, while the second display unit displays thereon a moving image and a real-time variable map image.

9. The car audio/video system as set forth in claim 6, wherein the external input source is at least one of a DVD player, a video cassette player, a rear view camera, and a game console box.

10. The car audio/video system as set forth in claim 9, wherein, when a reverse gear is selected, the control means displays an input image, automatically produced by the rear view camera in response to a reverse gear select signal, on the second display unit of the front panel.

* * * * *